(12) United States Patent
Harel et al.

(10) Patent No.: US 8,351,866 B2
(45) Date of Patent: *Jan. 8, 2013

(54) METHOD, APPARATUS AND SYSTEM FOR PROVIDING FEEDBACK TO A TRANSMIT DIVERSITY DEVICE

(75) Inventors: Haim Harel, New York, NY (US); Yair Karmi, Bridgewater, NJ (US); Kenneth Kludt, Bedminster, NJ (US); Sherwin J. Wang, Towaco, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,988

(22) Filed: Jan. 17, 2012

(65) Prior Publication Data

US 2012/0114059 A1    May 10, 2012

Related U.S. Application Data

(63) Continuation of application No. 13/102,288, filed on May 6, 2011, now Pat. No. 8,116,693, which is a continuation of application No. 12/046,689, filed on Mar. 12, 2008, now Pat. No. 8,036,603.

(60) Provisional application No. 60/918,066, filed on Mar. 15, 2007.

(51) Int. Cl.
 *H04B 1/00* (2006.01)
 *H04B 7/00* (2006.01)
(52) U.S. Cl. ............... 455/69; 455/68; 455/70; 375/267; 375/299
(58) Field of Classification Search .................... 455/68, 455/69, 70, 101, 103; 375/267, 299
See application file for complete search history.

(56) References Cited

U.S. PATENT DOCUMENTS

| | | | |
|---|---|---|---|
| 5,642,353 | A | 6/1997 | Roy, III et al. |
| 5,832,044 | A | 11/1998 | Sousa et al. |
| 5,991,330 | A | 11/1999 | Dahlman et al. |
| 5,999,826 | A | 12/1999 | Whinnett |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |

(Continued)

FOREIGN PATENT DOCUMENTS

EP     0 986 193     3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Tuan H Nguyen
(74) *Attorney, Agent, or Firm* — Gottlieb, Rackman & Reisman, PC

(57) ABSTRACT

A method and system for improving closed loop feedback in transmit diversity communication. In one embodiment of the invention, a predetermined variation of one or more transmit diversity parameters is performed at the transmit diversity transmitter. The receiver compares the transmit diversity parameter values of the received signals to the predetermined variation and transmits to the transmitter a value of a transmit diversity correction parameter. The transmitter may use this correction value to modify the transmit diversity parameter in a subsequent transmission.

3 Claims, 2 Drawing Sheets

U.S. PATENT DOCUMENTS

| | | | |
|---|---|---|---|
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,584,161 B2 * | 6/2003 | Hottinen et al. | 375/299 |
| 6,636,495 B1 | 10/2003 | Tangemann | |
| 6,690,747 B2 | 2/2004 | Petrus et al. | |
| 6,704,370 B1 | 3/2004 | Chheda et al. | |
| 6,745,009 B2 | 6/2004 | Raghothaman | |
| 6,754,473 B1 | 6/2004 | Choi et al. | |
| 6,810,264 B1 | 10/2004 | Park et al. | |
| 6,859,643 B1 | 2/2005 | Ma et al. | |
| 6,882,228 B2 | 4/2005 | Rofougaran | |
| 6,980,612 B1 * | 12/2005 | Miyoshi | 375/346 |
| 7,660,598 B2 | 2/2010 | Barnett et al. | |
| 7,729,714 B2 | 6/2010 | Black et al. | |
| 2003/0002594 A1 | 1/2003 | Harel et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |

FOREIGN PATENT DOCUMENTS

| | | |
|---|---|---|
| EP | 1 054 519 | 11/2000 |
| EP | 1 156 596 | 11/2001 |
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/72464 | 11/2000 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

"Universal Mobile Telecommunications System (UMTS); Physical Layer Procedures (FDD) (3GPP TS 25.214 Version 7.3.0 Release 7); ETSI TS 125 214", ETSI Standards, LIS, Sophia Antipolis Cedex, France, vol. 3-R1, No. V7.3.0, Dec. 1, 2006, pp. 1-61.

International Search Report for International Application No. PCT/US2008/057117 mailed Oct. 7, 2008.

Notification of the First Office Action, Patent Application No. 200880013038.5, Chinese Patent Office, Jan. 31, 2012.

* cited by examiner

METHOD, APPARATUS AND SYSTEM FOR PROVIDING FEEDBACK TO A TRANSMIT DIVERSITY DEVICE

CROSS REFERENCE TO RELATED APPLICATIONS

This application is a continuation application of U.S. patent application Ser. No. 13/102,288, filed on May 6, 2011, now U.S. Pat. No. 8,116,693,which is a continuation application of U.S. patent application Ser. No. 12/046,689, filed on Mar. 12, 2008, now U.S. Pat. No. 8,036,603, which claims the benefit of U.S. Provisional Patent Application No. 60/918,066, filed on Mar. 15, 2007, all of which are incorporated in their entirety herein by reference.

FIELD OF THE INVENTION

This invention relates generally to the field of wireless communications and more specifically to providing feedback to a transmit diversity device.

BACKGROUND OF THE INVENTION

Wireless transmission systems may use transmit diversity, in which signals are transmitted to a receiver using a plurality of transmit antennas. A receiving communication device extracts the information from the transmitted signals. Multiple antenna elements may enhance spectral efficiency and capacity, allowing for more users to be simultaneously served over a given frequency band, while reducing signal degradation caused by multi-path and fading. Transmit diversity parameters may be applied to signals transmitted from two or more antennas, and may modify an effective power distribution detected by receivers, such as base stations. The transmitted signals may propagate along different paths and may reach the receiving communication device with different phases that may destructively interfere. The received signal quality may change at a receiver that may be attempting to detect a transmission from a mobile terminal, as well as a noise level created by a wireless terminal transmission in base stations attempting to detect signals from other wireless terminals. A signal-to-noise ratio perceived by base stations may change with varying parameters of transmit diversity control. There is a need for a system, method, and apparatus to reduce interference of transmitted signals.

US Patent Publication No. 2003/0002594, entitled "Communication device with smart antenna using a quality-indication signal," published Jan. 2, 2003 and assigned to the assignee of the present application, the contents of which are incorporated herein by reference, describes using a power control signal, for example, as provided by the power control bit of the CDMA protocol, as a quality indication signal.

U.S. Pat. No. 5,999,826 (Whinnett) describes a method for remote receiver determination of weights of a transmit diversity array by the receiver being capable of identifying which received signal was transmitted from which antenna. This method requires transmitting a difference reference signal from each antenna. The reference signals are either tones, characterized by different carrier frequencies, different modulating frequencies (tones) or different digital codes. This method requires that the transmission of reference signals be defined by the air interface.

SUMMARY OF EMBODIMENTS OF THE INVENTION

In accordance with the present invention, disadvantages and problems associated with previous techniques for modifying transmit diversity signals may be reduced or eliminated. In some embodiments of the invention, the method, system and apparatus described in US Patent Publication No. 2003/0002594 may be improved, supplemented or replaced by those describe herein.

According to known methods of providing feedback to a transmit diversity transmitter, an iterative process is taught in which a power control bit or other quality indication signal may be used to indicate whether, as a result of a change of a diversity parameter, resultant power as measured at the feedback communication device, for example, a base station, has increased or decreased. One benefit of embodiments of the present invention may be the elimination or reduction of iterations in order to communicate a desirable diversity parameter, for example, a phase difference or a power ratio, from a base station to a transmit diversity mobile transmitter.

According to embodiments of the present invention, a mobile transmit diversity transmitter may transmit according to a phase difference pattern, and the base station may measure received signals, perform calculations to determine phase difference correction value and/or amplitude ratio correction value, and transmit the value(s) to the mobile station. The value(s) may be transmitted, for example, as a compressed binary value, a code from a codebook, or otherwise. The mobile station may then use this correction value to determine a modification to the transmit diversity parameter value in a subsequent transmission.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
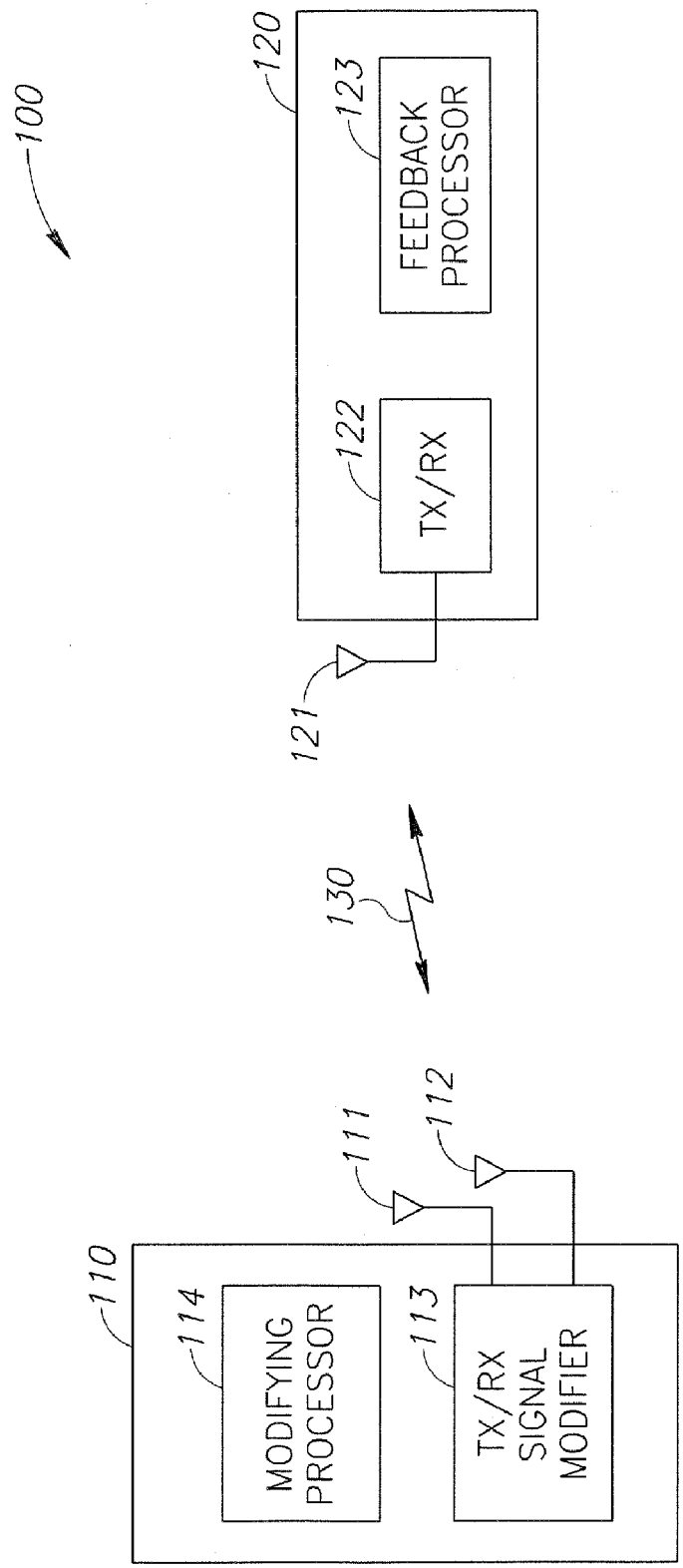
FIG. 1 is a block diagram illustrating one embodiment of a communication system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
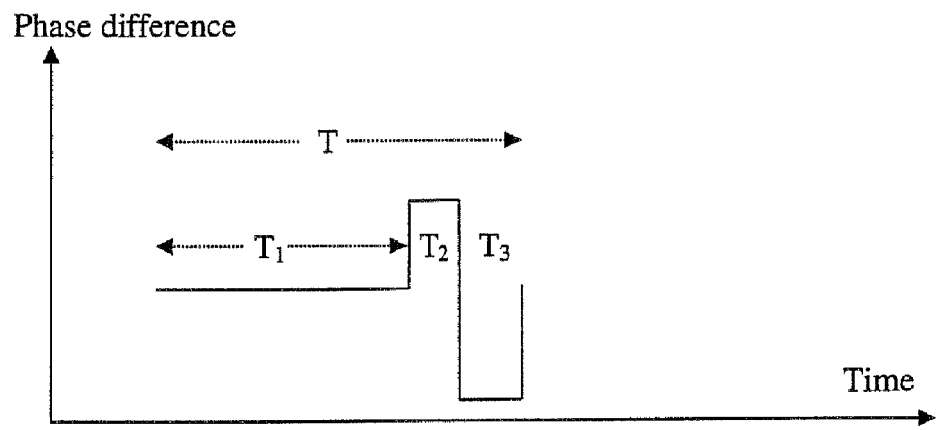
FIG. 2 is a schematic timeline of transmissions during a period according to an embodiment of the invention.
Figure 3:
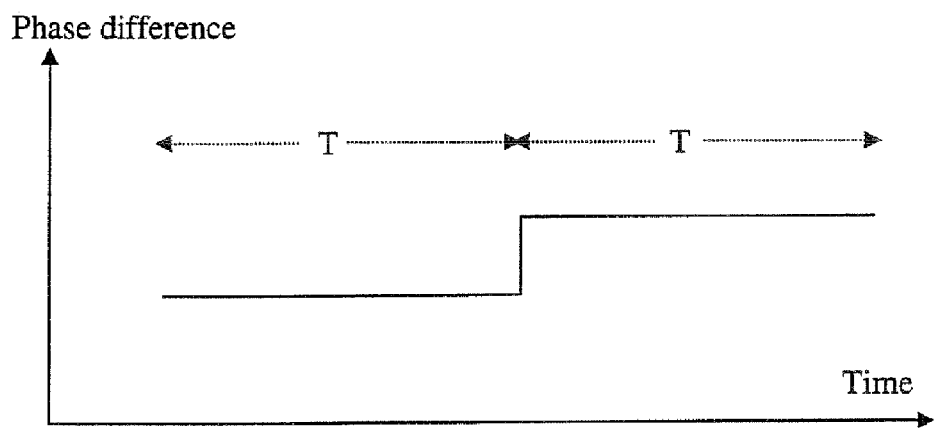
FIG. 3 is a schematic timeline of transmissions during a period according to an embodiment of the invention.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a communication system 100 that includes a transmitter 110, also referred to as a modifying communication device, that that adjusts a nominal value of a transmit diversity parameter, for example, a phase difference or a transmission power ratio between a signal transmitted on a first antenna 111 and a signal transmitted concurrently on a second antenna 112. According to the embodiment, transmitter may, for example, perturb a signal at a perturbation rate and transmit the signal to receiving communication device 120, also referred to as a feedback communication device. Feedback communication device 120 may receive the transmit diversity signal at antenna 121 and transmit/receive module 122, process the received signal using processor 123, and transmit feedback information that describes the signal as received by feedback communication device 120. Modifying communication device 110 may adjust a nominal value of a transmit diversity parameter at a nominal value adjustment rate based on the feedback information.

According to the illustrated embodiment, network 100 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Network 100 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 100 may use any suitable multiple access technology, for example, a code division multiple access (CDMA) technology. According to one embodiment, network 100 may operate according to a CDMA 2000 telecommunications technology that uses a single CDMA channel. As an example, a CDMA 2000 high rate data packet technology, such as the Evolution Data Only (EvDO) technology may be used.

Network 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of network 100 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 100 may include one or more modifying communication devices 110 and one or more feedback communication devices 120 that communicate via a wireless link 130. Either or both of communication devices 110 and 120 may be any device operable to communicate information via signals with one or more other communication devices. For example, either of communication devices 110 or 120 may comprise a mobile subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

In some embodiments of the invention, the feedback communication device 120 may be a base station, and the modifying communication device 110 may be a subscriber unit.

Either or both of communication devices 110 or 120 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 110 and 120 such as wireless link 130 may be a radio frequency link that is cellular in network organization. Wireless link 130 may be used to communicate a signal between communication devices 120 and 110.

As described more fully below, according to embodiments of the present invention, modifying communication device 110 may include a processor 114 and a transmit/receive module 113 that calculate and produce one or more signals for transmission over at least first and second antennas 111 and 112.

Feedback communication device 120 may include a processor 123 and transmit/receive module 122 that generate and transmit a feedback signal that indicates the quality of the modified signal as received at the feedback communication device 120. Modifying communication device 110 may then modify the transmit signal in accordance with feedback information corresponding to the feedback signal.

According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 110. According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device 110 may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, for example, longer or more complex, sequence of modulations. As an example with respect to phase, a perturbation may include modulating the phase difference in a first direction, and modulating the phase difference in a second direction. If the feedback information provided by the feedback communication device 120 indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be perturbed at a first rate, designated the perturbation rate, and the nominal value of the transmit diversity parameter may be adjusted at a second rate, designated the nominal value adjustment rate. The perturbation rate and the nominal value adjustment rates may be the substantially the same or they may be different, and each one may be substantially the same or different than the feedback rate.

According to an embodiment of the present invention, the transmit diversity transmitter, for example, a mobile device with a plurality of antennas, may transmit a first signal and a second signal, each signal having equal amplitude, using the respective antennas. The first and second signals may be transmitted sequentially with a perturbation in the phase differences between the transmitting antennas. Thus, for example, a signal may be transmitted over the antennas first using a first phase difference, and then a signal may be transmitted using a second phase difference, perturbed from the first phase difference. The signals are transmitted over carrier angular frequency ω.

The signals may be received at a receiver, for example, a base station. At the receiver, the signals may be received with different amplitudes, for example, due to difference in path loss and/or potential imbalance at the mobile station. The relative or normalized amplitude of the second received signal relative to the first received signal is denoted A. The two signals may also be received with different phases, for example, due to the intentional phase difference introduced at the transmitter as well as due to the differences in effective propagation paths, wherein the difference in received phase is denoted φ. Thus, the signal from the first antenna is received by the base station as $s_1(t)$, and the signal from the second antenna as $s_2(t)$. Here, $s_1(t)$ and $s_2(t)$ denote signals received by the base station and illustrate maximum combined amplitude received when their phase difference φ is zero.

It will be readily evident that in the following equations, the following conventions are used for the notation of trigonometric and other functions:

sin(x) is the sine function of x;
cos(x) is the cosine function of x;
tg(x) is the tangent function of x;
argtg(x) is the arc-tangent function of x;

$$\frac{\partial f}{\partial x}$$

is the partial derivative of the function f relative to the variable x; and $$\frac{\partial^2 f}{\partial x^2}$$

is the partial second derivative of the function f relative to the variable x.

The two received signals may combine at the base station to form s(t), and therefore:

$$s_1(t) = \sin(\omega t) \quad (1)$$

$$s_2(t) = A \sin(\omega t + \phi) \quad (2)$$

$$s(t) = s_1(t) + s_2(t) \quad (3)$$

$$\begin{aligned} s(t) &= \sin(\omega t) + A\sin(\omega t + \varphi) \\ &= \sin(\omega t) + A[\sin(\omega t)\cos(\varphi) + \cos(\omega t)\sin(\varphi)] \\ &= B(\varphi)\sin(\omega t) + C(\varphi)\cos(\omega t), \end{aligned} \quad (4)$$

where $$B(\phi) = 1 + A\cos(\phi)$$

$$C(\phi) = A\sin(\phi) \quad (5)$$

Therefore, it will be recognized that:

$$s(t) = B(\phi)[\sin(\omega t) + D(\phi)\cos(\omega t)], \quad (6)$$

where $$D(\varphi) = \frac{C(\varphi)}{B(\varphi)} = tg(\gamma) = \frac{\sin(\gamma)}{\cos(\gamma)}. \quad (7)$$

So:

$$s(t) = \frac{B(\varphi)}{\cos(\gamma)}[\cos(\gamma)\sin(\omega t) + \sin(\gamma)\cos(\omega t)] \quad (8)$$

Or the final expression for the signal received by the base station can be written as:

$$s(t) = \frac{B(\varphi)}{\cos(\gamma)} \sin(\omega t + \gamma) \quad (9)$$

Therefore, for the model of two transmitted sinusoids, the signal received by the base station is also a sinusoid with the same frequency but different amplitude and phase. γ depends on the basic variables A and φ, defined above in (1):

$$\gamma = \arctg\left[\frac{C(\varphi)}{B(\varphi)}\right] = \arctg\left[\frac{A\sin(\varphi)}{1 + A\cos(\varphi)}\right], \quad (10)$$

and the final expression of the received signal may thus be written as a function of the unknown variables A, φ:

$$s(t) = \frac{1 + A\cos(\varphi)}{\cos\left(\arctg\left[\frac{A\sin(\varphi)}{1 + A\cos(\varphi)}\right]\right)} \sin\left(\omega t + \arctg\left[\frac{A\sin(\varphi)}{1 + A\cos(\varphi)}\right]\right). \quad (11)$$

Assuming a transmit cycle of duration T, known to both the transmitter and receiver, for example, to the mobile station and to the base station, where the mobile transmits with a nominal phase during period $T_1$, then introduces a phase perturbation of $\alpha_1$ for a period of $T_2$, followed by a phase perturbation of $\alpha_2$ for a period of $T_3$. From (11), it may be deduced that the signal has an amplitude AMP, where:

$$AMP = \frac{1 + A\cos(\varphi)}{\cos\left(\arctg\left[\frac{A\sin(\varphi)}{1 + A\cos(\varphi)}\right]\right)}, \quad (12)$$

and phase PH, where:

$$PH = \arctg\left[\frac{A\sin(\varphi)}{1 + A\cos(\varphi)}\right]. \quad (13)$$

FIG. 2 depicts a period T according to an embodiment of the invention in which perturbed signals $T_2$ and $T_3$ appear after $T_1$, which has longer duration. It will be noted that from a processing delay point of view, the timing of $T_2$ and $T_3$ in the cycle, for example, at the end, middle or beginning of the cycle, may shorten the overall system delay. In one embodiment of the invention, $T_1$ may be approximately 90% of total period T, and each of $T_2$ and $T_3$ may be 5% of total period T.

Because these time periods are known at both the base station and the mobile station, amplitudes and phases may be compared for the times $T_1$, $T_2$, and $T_3$ as follows:

For $T_1$: (14)

$$AMP(T_1) = \frac{1 + A\cos(\varphi)}{\cos\left(\arctg\left[\frac{A\sin(\varphi)}{1 + A\cos(\varphi)}\right]\right)}$$

$$PH(T_1) = \arctg\left[\frac{A\sin(\varphi)}{1 + A\cos(\varphi)}\right] \quad (15)$$

For $T_2$: (16)

$$AMP(T_2) = \frac{1 + A\cos(\varphi + \alpha_1)}{\cos\left(\arctg\left[\frac{A\sin(\varphi + \alpha_1)}{1 + A\cos(\varphi + \alpha_1)}\right]\right)}$$

$$PH(T_2) = \arctg\left[\frac{A\sin(\varphi + \alpha_1)}{1 + A\cos(\varphi + \alpha_1)}\right] \quad (17)$$

For $T_3$: (18)

$$AMP(T_3) = \frac{1 + A\cos(\varphi + \alpha_2)}{\cos\left(\arctg\left[\frac{A\sin(\varphi + \alpha_2)}{1 + A\cos(\varphi + \alpha_2)}\right]\right)}$$

$$PH(T_3) = \arctg\left[\frac{A\sin(\varphi + \alpha_2)}{1 + A\cos(\varphi + \alpha_2)}\right] \quad (19)$$

The case where $\alpha_2 = -\alpha_1$ is a special symmetric perturbation case of the above.

Using the above equations, a new value for φ is sought that will maximize the AMP function given the set of measured parameters $y_1$ through $y_4$:

$$y_1 = \frac{AMP(T_2)}{AMP(T_1)} \quad (20)$$

$$y_2 = \frac{AMP(T_3)}{AMP(T_1)} \quad (21)$$

$$y_3 = \gamma(T_2) - \gamma(T_1) = PH(T_2) - PH(T_1) \quad (22)$$

$$y_4 = \gamma(T_3) - \gamma(T_1) = PH(T_3) - PH(T_1) \quad (23)$$

By using the ratio of amplitudes, the unknown scaling may be canceled.

Accordingly, variables A and φ may be determined as the values that best fit the set of equations (24)-(27) as follows:

$$y_1 = \frac{\frac{1 + A\cos(\varphi + \alpha_1)}{\cos\left(\arctg\left[\frac{A\sin(\varphi + \alpha_1)}{1 + A\cos(\varphi + \alpha_1)}\right]\right)}}{\frac{1 + A\cos(\varphi)}{\cos\left(\arctg\left[\frac{A\sin(\varphi)}{1 + A\cos(\varphi)}\right]\right)}} \quad (24)$$

$$y_2 = \frac{\frac{1 + A\cos(\varphi + \alpha_2)}{\cos\left(\arctg\left[\frac{A\sin(\varphi + \alpha_2)}{1 + A\cos(\varphi + \alpha_2)}\right]\right)}}{\frac{1 + A\cos(\varphi)}{\cos\left(\arctg\left[\frac{A\sin(\varphi)}{1 + A\cos(\varphi)}\right]\right)}} \quad (25)$$

$$y_3 = \arctg\left[\frac{A\sin(\varphi + \alpha_1)}{1 + A\cos(\varphi + \alpha_1)}\right] - \arctg\left[\frac{A\sin(\varphi)}{1 + A\cos(\varphi)}\right] \quad (26)$$

$$y_4 = \arctg\left[\frac{A\sin(\varphi + \alpha_2)}{1 + A\cos(\varphi + \alpha_2)}\right] - \arctg\left[\frac{A\sin(\varphi)}{1 + A\cos(\varphi)}\right] \quad (27)$$

The estimation of best fit values for A and φ may be carried out using well-known numerical methods that need not be detailed herein. Once A and φ are known, a correction β may be determined by maximizing the following AMP(T'):

$$AMP(T') = \left| \frac{1 + A\cos(\varphi + \beta)}{\cos\left(arctg\left[\frac{A\sin(\varphi + \beta)}{1 + A\cos(\varphi + \beta)}\right]\right)} \right| \Rightarrow \max \quad (28)$$

i.e., from the set (29)

$$\frac{\partial AMP(T')}{\partial \beta} = 0 \quad (29)$$

$$\frac{\partial^2 AMP(T')}{\partial \beta^2} < 0$$

The value of β may be computed by standard numerical evaluation of the formula to determine its maximum, or from a look-up table, or from any mathematically available closed formula. The mathematical derivation of (29) shows that AMP(T') is at a maximum when:

$$\beta = -\varphi \quad (30)$$

and the maximum value is $$\max\{AMP(T')\} = 1 + A \quad (31)$$

The base station may therefore transmit to the mobile station the numerical value of β, as calculated above. The mobile station may correct the previous nominal phase difference between a signal transmitted through its antenna ports by β, so the present phase difference φ becomes φ+β. It will be recalled that φ represents the phase difference received at the phase difference, which is approximately the phase difference transmitted plus a phase difference due to the propagation path.

Additionally or alternatively, in an embodiment of the invention, one period may be transmitted with a certain phase difference and power ratio, and a subsequent period may be transmitted based on the last control of the base station so no perturbation is required, as shown in FIG. 3. Since the above computation provided four measurements to compute two unknowns, the same math applies here.

In an embodiment of the invention, which may produce further accuracy, the base station may use a number of measurements of previous cycles to provide a more robust solution in terms of signal-to-noise ratio (SNR), at the expense of higher sensitivity to mobility due to the longer history used.

In yet another embodiment of the invention, the base station may provide information to the mobile station for the correction of the amplitude ratio, i.e. the relative power division of the transmitted signals between the antenna ports of the mobile station, so as to maximize the received signal.

In actual implementation of this invention, it should be taken into account that there may be apparent frequency differences among the signal transmitted by the mobile station, the signal received by the base station, and the internal frequency reference of the base station. Since the invention of the present application may include estimation of phase differences at different times, differences in frequency between the estimator and the signals being estimated may induce a time-dependent phase difference Δφ(t) related to the differences in angular frequency Δω and the elapsed time Δt:

$$\Delta\varphi(t) = \Delta\omega\Delta t \quad (32)$$

The base station may therefore estimate the phase difference or phase drift and compensate for it after estimating the frequency difference between the signal it receives and its internal time reference. These solutions are well known to those versed in the art.

In an embodiment of the invention, the base station may provide correction for both phase and amplitude ratio of the transmitted signals so as to maximize the received signal.

In yet another embodiment of this invention, the base station may estimate the future optimal phase difference or optimal amplitude ratio communicated to the base station using standard linear or non-linear prediction techniques well known to those versed in the art. This means that rather than send the result computed based on past signals as described in (30) and above, a predictor is applied to determine what should be the optimal parameters by the time they are applied by the mobile station.

In yet another embodiment of this invention, the base station sends correction parameters and the mobile station determines what parameters should be applied by applying linear or non-linear prediction techniques well known to those versed in the art. This embodiment may be optimized by knowing the times to which the base station computations refer, which may be set up by an agreement or standard.

In yet another embodiment of this invention, the mobile may correct the parameters it applies by measuring variations in the downlink signal it receives from the base station. This allows the mobile station to immediately apply a compensation for variations caused, for example, by the mobile rotation, change in position or change in velocity relative to the base station. These corrections are applied by using the same estimation techniques as required for the previous embodiment, including estimation of frequency difference and application of the required changes per the time period. When combined with the dual antenna reception in the mobile station, changes in the amplitude of the signals received by the two antennas may be applied to the amplitude ratio of the transmitted signal.

Corrections introduced by the mobile station by means of prediction or measurements of the downlink signals it receives may be applicable to any application of transmit diversity control in the mobile station, whether based on provision of transmit diversity control parameters (phase difference or amplitude) by the base station or transmit diversity control parameters computed by the mobile station using this or other inventions, for example, power control based.

Although the various embodiments were described related to the uplink transmit diversity control, the roles of the base station and mobile station may be reversed so as to apply the teachings of the present invention to downlink transmit diversity control.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals may tune the communication device. In other words, the tuning of a communication device through the use of such control signals need not be limited to information about varying the magnitude and phase of the signal. For example, the control signals may carry information to vary the magnitude, phase, frequency and/or timing of the signal associated with each antenna element.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

What is claimed is:

1. A method of using feedback by a transmit diversity mobile communication device comprising:
    transmitting by a mobile communication device a plurality of signals to a base station, said plurality of signals transmitted by a plurality of antennas using a phase difference;
    receiving from said base station a phase difference correction based on said transmitted plurality of signals, wherein the phase difference correction is in a form selected from the group consisting of a compressed binary value and a code from a codebook; and
    calculating a modified phase difference based on the received phase difference correction; and
    transmitting by the mobile communication device on said plurality of antennas a modified signal using said modified phase difference, wherein the signals transmitted on each of the antennas differ by the modified phase difference.

2. The method of claim 1, wherein transmitting said plurality of signals to the base station comprises transmitting a first plurality of signals from the mobile communication device using at least two antennas, wherein the transmitted signals on each of the antennas differ by a first phase difference.

3. The method of claim 2, wherein calculating the modified phase difference comprises calculating the modified phase difference based on the first phase difference and the phase difference correction.

* * * * *